United States Patent
Graham et al.

(10) Patent No.: US 6,947,539 B2
(45) Date of Patent: Sep. 20, 2005

(54) AUTOMATED CALL ROUTING

(76) Inventors: Jeffrey P. Graham, P.O. Box 896, Franconia, NH (US) 03580; Marie Josee-Labine, 329 Bedford St., Lexington, MA (US) 02420; Richard A. Phillips, 77 Pelham Rd., Hudson, NH (US) 03051

( * ) Notice: Subject to any disclaimer, the term of this patent is extended or adjusted under 35 U.S.C. 154(b) by 239 days.

(21) Appl. No.: 10/218,339

(22) Filed: Aug. 14, 2002

(65) Prior Publication Data

US 2004/0032941 A1 Feb. 19, 2004

(51) Int. Cl.[7] .............................................. H04M 7/00
(52) U.S. Cl. ................ 379/219; 379/88.01; 379/201.02
(58) Field of Search ........................... 379/88.01, 88.03, 379/211.01, 211.02, 218.01, 219, 220.01, 201.02; 704/231, 246

(56) References Cited

U.S. PATENT DOCUMENTS

| | | | |
|---|---|---|---|
| 6,167,117 A | * 12/2000 | Will | 379/88.03 |
| 6,173,266 B1 | 1/2001 | Marx et al. | 704/270 |
| 6,269,153 B1 | 7/2001 | Carpenter et al. | 379/88.02 |
| 6,404,876 B1 | * 6/2002 | Smith et al. | 379/218.01 |
| 6,421,672 B1 | 7/2002 | McAllister et al. | 707/10 |

* cited by examiner

Primary Examiner—Benny Tieu
(74) Attorney, Agent, or Firm—Edouard Garcia

(57) ABSTRACT

Automated call routing systems and methods are described. In one implementation, a speech recognition directory system facilitates the routing of callers based upon stored results of recent disambiguations, which may be stored in heuristic profiles that are associated with callers. Instead of requiring a caller to process a series of disambiguation attempts, in which secondary information is presented for the caller's approval, this call routing scheme leverages the fact that the user is likely seeking a person they've previously contacted. In large directories, this call routing scheme improves the speed of the transaction and eliminates the frustration of the disambiguation process. Rather than pursuing a disambiguation process with the caller, the call routing system may immediately announce the transfer. The caller may abort the process if the selected call destination is incorrect. In some implementations, if the caller selects a call destination that is not within the caller's associated heuristic profile, the new selection is added to the caller's associated heuristic profile in FIFO fashion. The heuristic profile may be configurable, allowing a limited, or more extensive, repository of past caller selections.

28 Claims, 4 Drawing Sheets

AUTOMATED CALL ROUTING

TECHNICAL FIELD

This invention relates to automated call routing systems and methods.

BACKGROUND

Large enterprises receive numerous telephone calls, each of which must be routed in accordance with callers' instructions. Calls typically are routed by a human operator or an automated call routing system (commonly referred to as an "automated attendant" or "autoattendant"). Human operators typically route calls accurately and efficiently, but at a relatively high cost. Autoattendant systems, on the other hand, typically are cheaper to implement, but tend to be less accurate and efficient than human operators. For example, some autoattendants present a caller with a hierarchical menu consisting of a list of choices through which the caller must navigate. Often, making a choice opens up a menu of further choices. In large organizations, the menu hierarchy may be very complex, requiring several choices by a caller, and requiring a caller to listen to a long menu list in order to understand the available choices. Navigating through such menu hierarchies typically is a frustrating and lengthy process for most callers and not very efficient.

Traditionally, autoattendants play an announcement to the caller and prompt a caller to make one of multiple selections using a voice response unit. For example, the caller may be prompted to dial the extension of the party being called. The caller also may be given other options, such as leaving a voice message or accessing a directory of names if the extension of the called party is not known. Some early automated telephone directories required the caller to spell the name of the called party using a telephone dual-tone multifrequency (DTMF) keypad. Most recent autoattendant systems are voice-enabled, allowing callers to be routed to a desired call destination simply by speaking the name of the call destination. In these systems, an autoattendant answers an incoming call and asks the caller to speak the name of the party or department being called. The autoattendant includes a speaker-independent speech recognition engine that identifies and translates a received speech signal into name data. The autoattendant obtains a telephone number corresponding to the translated name data from a telephone number directory based on the translated name data, and routes the call to that telephone number.

When a call destination name search provides an ambiguous result, some conventional autoattendant systems rely on the caller's ability to distinguish between parties based on telephone numbers or other information. These systems become increasingly more cumbersome as the number of similar names that are maintained in the call destination directory increases. Other autoattendant systems use secondary information that is contained in subscriber listings to disambiguate search results and provide the telephone number and other data that are associated with a desired party.

SUMMARY

The invention features improved call routing systems and methods that retain information from disambiguation sessions with callers to reduce repeated exposure of callers to future disambiguation sessions. In this way, the invention enables a call routing system to learn from interactions with the caller and, thereby, become more efficient over time. The invention also improves caller satisfaction by reducing the amount of caller interaction with the system and by speeding the call routing process.

In one aspect, the invention features a call routing system that includes a search module and a disambiguation module. The search module is operable to generate a hypothesis list of candidate call destinations based on one or more queries to a call destination directory in response to a call destination request that is received from a caller. The disambiguation module is operable to compare a hypothesis list, which is generated in response to a call destination request by a given caller and contains multiple candidate call destinations, with a heuristic profile that is associated with the given caller and contains one or more records of prior disambiguation selections made by the caller.

In another aspect, the invention features a call routing method, in accordance with which a hypothesis list of candidate call destinations is generated based on one or more queries to a call destination directory in response to a call destination request received from a caller. A hypothesis list, which is generated in response to a call destination request by a given caller and contains multiple candidate call destinations, is compared with a heuristic profile that is associated with the given caller and contains one or more records of prior disambiguation selections made by the caller.

In another aspect, the invention features a computer program for implementing the above-described call routing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
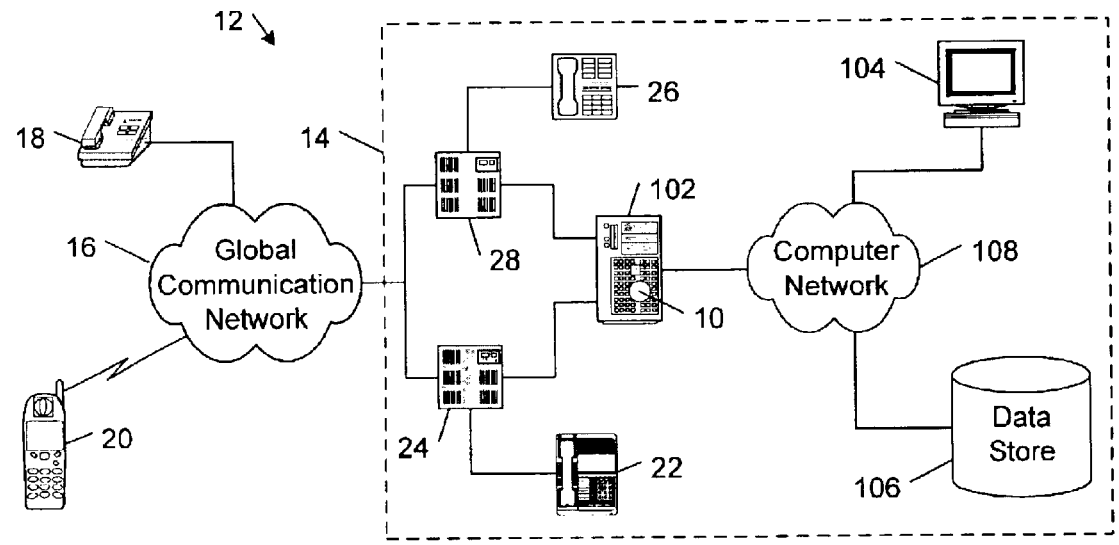
FIG. 1 is diagrammatic view of a network on which a call routing system is implemented for handling internal and external telephone calls to and from a business enterprise.

Referring to FIG. 1, in one embodiment, a call routing system 10 may be implemented in the context of a telephony network 12 that is operable to handle internal and external telephone calls to and from a business enterprise 14. Telephony network 12 includes a global communication network 16, which may include a number of different computing platforms and transport facilities, including a voice network, a wireless network, and a computer network. An external caller using a conventional land-line telephone 18 may communicate with call routing system 10 over the public switch telephone network (PSTN), whereas an external caller using a cellular telephone 20 may communicate with call routing system 10 over a conventional wireless network (e.g., an AMPS, GSM, TDMA or CDMA cellular network system). An internal caller using an internet protocol (IP) telephone 22 may communicate with call routing system 10 through an IP private branch exchange (PBX) 24, and an internal caller using a digital telephone 26 may communicate with call routing system 10 through a conventional PBX.

Figure 2:
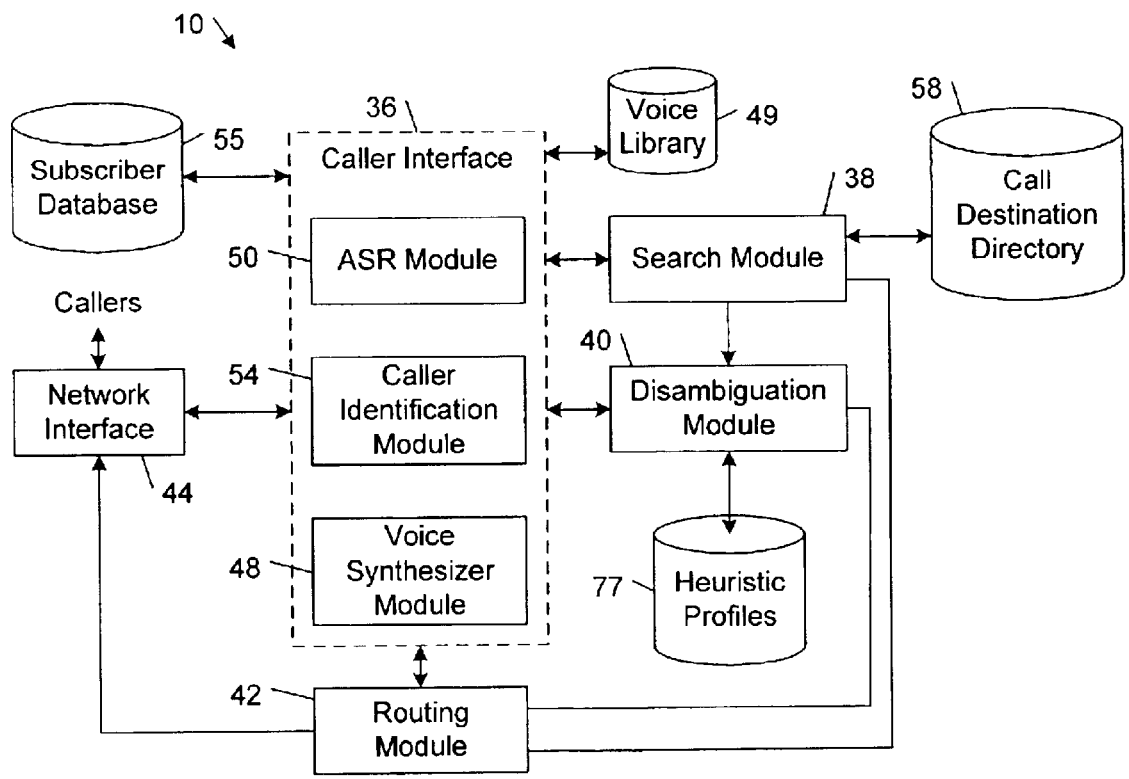
FIG. 2 is a block diagram of a call routing system.
Figure 3A:
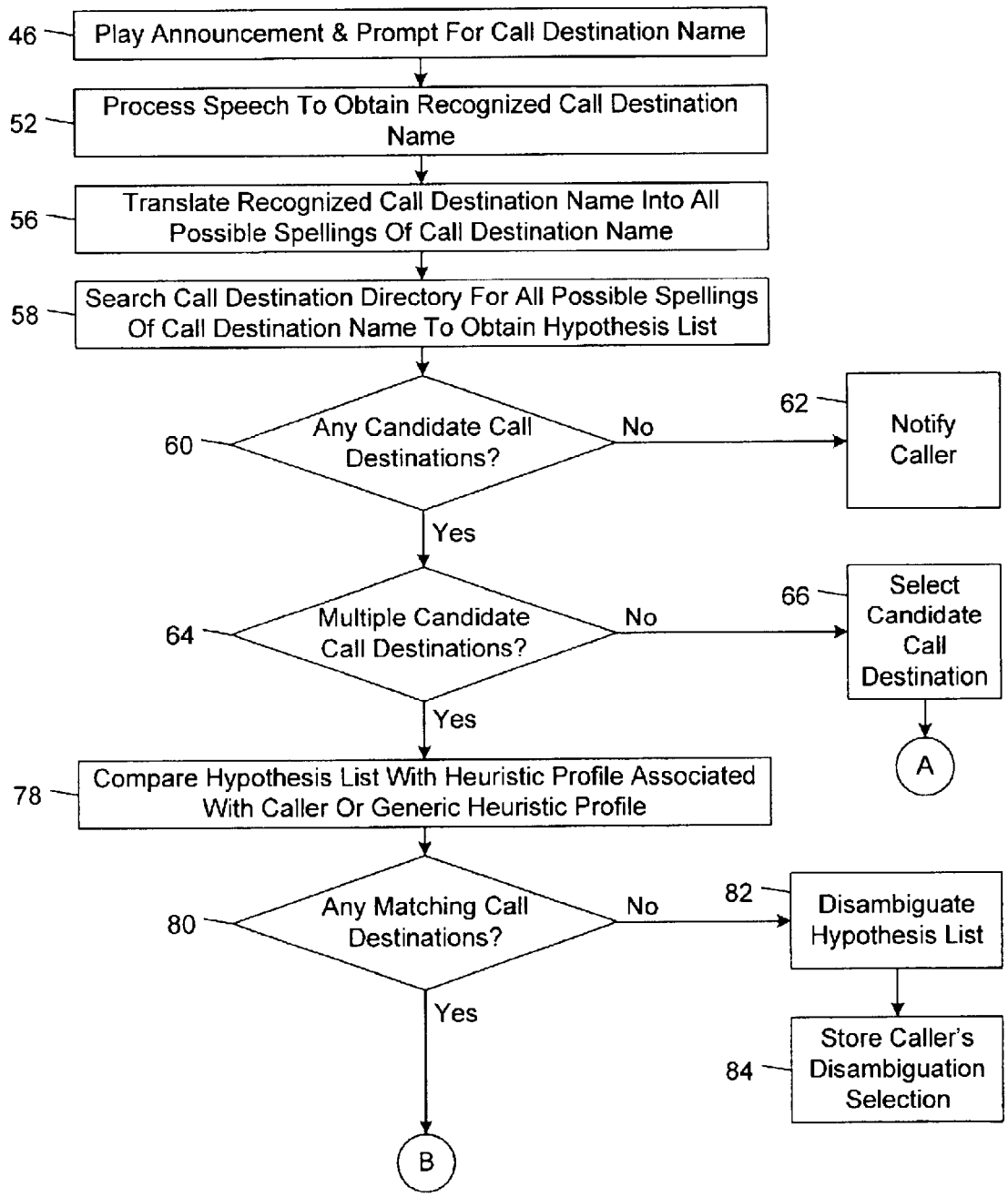
FIGS. 3A and 3B are flow diagrams of a call routing method.
Figure 3B:
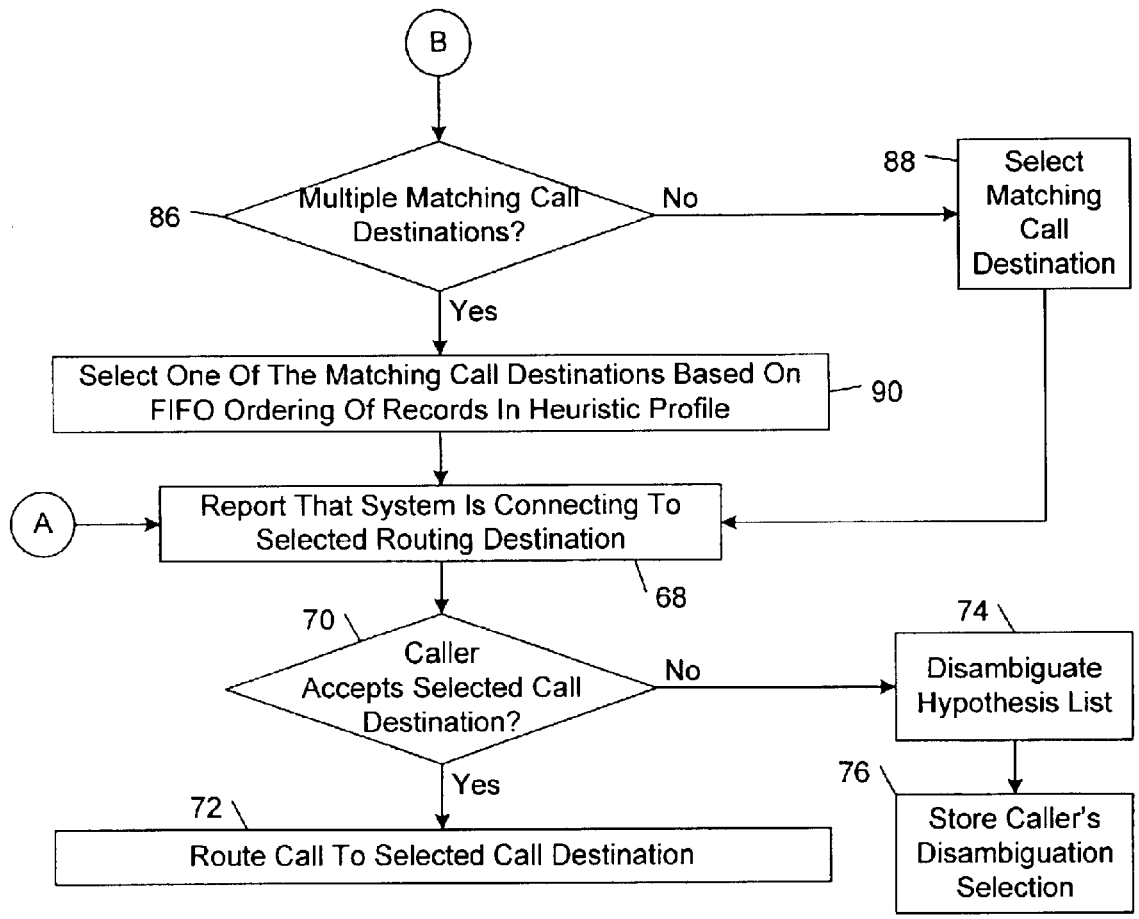

Referring to FIGS. 2, 3A and 3B, in some embodiments, call routing system 10 includes a caller interface 36, a search module 38, a disambiguation module 40, and a routing module 42.

Caller interface 36 is operable to receive call destination requests from callers through a network interface 44. In the illustrated embodiment, network interface 44 is implemented as a trunk group provided by either IP PBX 24 or PBX 28. In other embodiments, network interface may be in the form of single or multiple POTS (plain old telephone service) or ISDN (integrated services digital network) lines. When a call is received, caller interface 36 may transmit to the caller an announcement (or greeting) and a request for the caller to say a call destination name (step 46; FIG. 3A). The announcement and call destination name request may be in the form of synthesized speech that is generated by a voice synthesizer module 48 or one or more pre-recorded audio files (e.g., pulse code modulation files or WAV files) that may be stored in a voice library 49.

After the caller says the name of a call destination, network interface 44 transmits the audio signal that is received from the caller to an automatic speaker-independent speech recognition (ASR) module 50, which is operable to convert audio speech signals into a digital data stream that includes a recognized call destination name (step 52; FIG. 3A). This digital data stream may be in the form of ASCII text and, preferably, includes the phonetic equivalents (or phonemes) of the converted speech signals.

In some embodiments, network interface 44 also is operable to transmit to a caller identification module 54 a subscriber number, telephone number, or both, that may be received from an automatic number identification (ANI) service. Caller identification module 54 may retrieve information about the caller from a subscriber database 55 based on the number received from the ANI service. In other embodiments, caller identification module 54 may determine the identity of the caller by transmitting one or more information requests (e.g., "Please say your name or identification number?") to the caller. The information requests may be in the form of speech that is synthesized by voice synthesizer module 48 or one or more pre-recorded audio files (e.g., pulse code modulation files or WAV files) that may be stored in voice library 49.

Search module 38 is operable to parse the digital data stream that is received from the ASR module 50 for the recognized name of the call destination requested by the caller. Search module 38 then translates the recognized call destination name into all possible spellings of the call destination name, including primary and alternative spellings of the call destination name and any exceptional spellings of the call destination name (step 56; FIG. 3A). Search module 38 queries a call destination directory 58 to obtain a hypothesis list of all of the candidate call destinations corresponding to all of the possible spellings of the requested call destination name (step 58; FIG. 3A). If the hypothesis list does not contain any candidate call destinations (step 60; FIG. 3A), the search module notifies the caller interface 36 to report to the caller that the requested call destination was not found (step 62; FIG. 3A). At this point, the caller interface 36 may prompt the caller to say the requested call destination again or prompt the caller to say a different call destination.

In some embodiments, if the hypothesis list contains one or more candidate call destinations, the caller may be requested to confirm that the recognized call destination name corresponds to the requested candidate call destination.

If the hypothesis list contains a single candidate call destination (step 64; FIG. 3A), search module 38 selects that candidate call destination as the routing destination (step 66; FIG. 3A). The routing destination is transmitted to routing module 42, which notifies the caller interface 36 to report to the caller that the system is connecting the caller to the selected routing destination (step 68; FIG. 3B). At this point, the caller has the option of accepting the selected routing destination by simply staying on the line. Alternatively, the caller may say "Cancel" or provide some other indication that the selected routing destination is incorrect or no longer wanted. If the caller accepts the selected routing destination (step 70; FIG. 3B), the call is routed to the selected routing destination (step 72; FIG. 3B). Otherwise, the hypothesis list is disambiguated by disambiguation module 40 using a conventional disambiguation method (step 74; FIG. 3B). After the hypothesis list is disambiguated (step 74; FIG. 3B), the caller's disambiguation selection is stored in a heuristic profile (described in detail below) that is associated with the caller's identity, which was determined by the caller identification module 54 (step 76; FIG. 3B).

If the hypothesis list contains multiple candidate call destinations (step 64; FIG. 3A), the hypothesis list is compared with a heuristic profile 77 that is associated with the caller's identity, which was determined by caller identification module 54 (step 78; FIG. 3A). If there is no heuristic profile associated with the caller's identity, disambiguation module 40 may compare the hypothesis list with a generic heuristic profile. The generic heuristic profile may contain, for example, a list of call destinations that may be sorted in accordance with one or more associated disambiguation fields (e.g., name, location, or division).

If there are no matching call destinations in the hypothesis list and the caller's heuristic profile (step 80; FIG. 3A), the hypothesis list is disambiguated by disambiguation module 40 using a conventional disambiguation method (step 82; FIG. 3A). After the hypothesis list is disambiguated (step 82;

FIG. 3A), the caller's disambiguation selection is stored in a heuristic profile (described in detail below) that is associated with the caller's identity, which was determined by the caller identification module 54 (step 84; FIG. 3A).

If there is only one matching call destination in the hypothesis list and the caller's heuristic profile (step 86; FIG. 3B), that candidate call destination is selected as the routing destination (step 88; FIG. 3B). The routing destination is transmitted to routing module 42, which notifies the caller interface 36 to report to the caller that the system is connecting the caller to the selected routing destination (step 68; FIG. 3B). At this point, the caller has the option of accepting the selected routing destination by simply staying on the line. Alternatively, the caller may say "Cancel" or provide some other indication that the selected routing destination is incorrect. If the caller accepts the selected routing destination (step 70; FIG. 3B), the call is routed to the selected routing destination (step 72; FIG. 3B). Otherwise, the hypothesis list is disambiguated by disambiguation module 40 using a conventional disambiguation method (step 74; FIG. 3B). After the hypothesis list is disambiguated (step 74; FIG. 3B), the caller's disambiguation selection is stored in a heuristic profile (described in detail below) that is associated with the caller's identity, which was determined by the caller identification module 54 (step 76; FIG. 3B).

If there are multiple matching call destinations in the hypothesis list and the caller's heuristic profile (step 86; FIG. 3B), disambiguation module 40 selects a matching call destination as the routing destination in accordance with a FIFO (first in, first out) ordering of the caller's heuristic profile (i.e., the most recently called matching call destination is selected) (step 90; FIG. 3B). The routing destination is transmitted to routing module 42, which notifies the caller interface 36 to report to the caller that the system is connecting the caller to the selected routing destination (step 68; FIG. 3B). At this point, the caller has the option of accepting the selected routing destination by simply staying on the line. Alternatively, the caller may say "Cancel" or provide some other indication that the selected routing destination is incorrect. If the caller accepts the selected routing destination (step 70; FIG. 3B), the call is routed to the selected routing destination (step 72; FIG. 3B). Otherwise, the hypothesis list is disambiguated by disambiguation module 40 using a conventional disambiguation method (step 74; FIG. 3B). After the hypothesis list is disambiguated (step 74; FIG. 3B), the caller's disambiguation selection is stored in a heuristic profile (described in detail below) that is associated with the caller's identity, which was determined by the caller identification module 54 (step 76; FIG. 3B).

The following is an exemplary caller interaction with call routing system 10.

"Please say the name?"

User says "John Smith"

Auto-Accept the following hypothesis:

| Hypo | Interp | Id | Recog Text | d1 | In Heuristic Profile |
|------|--------|----|-----------|-----|---------------------|
| 1 | 1 | 11111111 | John Smith | Boston | No |
| 1 | 2 | 22222222 | John Smith | New York | Yes |
| 1 | 3 | 33333333 | John Smith | San Diego | No |

Check heuristic profile: 22222222 is in the list.

AA: 22222222

"<John Smith>-New York. Please Hold."

Users says "Cancel"

"There are still 2 matches. Do you want <John Smith>in Boston?No

"Do you want <John Smith>in San Diego?" Yes

Update heuristic profile with 33333333

The following is another exemplary caller interaction with call routing system 10 when call routing system 10 is configured to confirm the call destination name recognized by search module 38.

"Please say the name?"

User says "John Smith"

Confirm the following hypothesis:

| Hypo | Interp | Id | Recog Text | d1 | In Heuristic List |
|------|--------|----|-----------|-----|-------------------|
| 1 | 1 | 11111111 | John Smith | Boston | No |
| 1 | 2 | 22222222 | John Smith | New York | Yes |
| 1 | 3 | 33333333 | John Smith | San Diego | No |

"Do you mean <TTS: John Smith>?" Yes

Check heuristic profile: 22222222 is in the list.

AA: 22222222

"<John Smith>-New York. Please Hold."

Users says "Cancel"

"There are still 2 matches. Do you want <John Smith>in Boston?No

"Do you want <John Smith>in San Diego?" Yes

Update heuristic profile with 33333333

Figure 4:
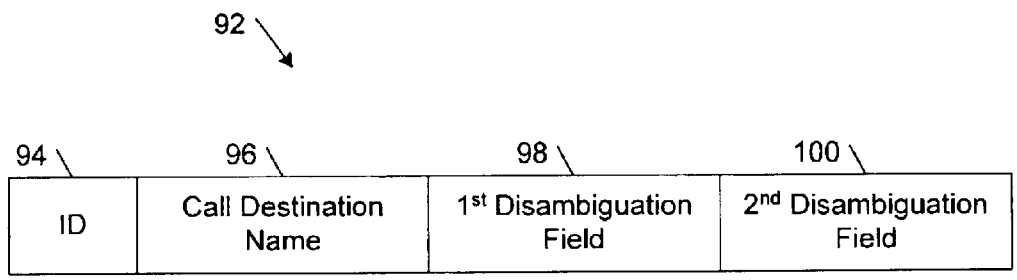
FIG. 4 is a diagrammatic view of a disambiguation selection data record of a heuristic profile that is associated with a caller.

Referring to FIG. 4, in some embodiments each disambiguation selection that is made by a caller is stored in the caller's heuristic profile as a data structure 92 that includes an identification number field 94, a call destination name field 96, a first disambiguation field 98, and a second disambiguation field 100. The identification number field 94 contains the identification number of a call destination that was selected by the caller during a disambiguation session. The call destination name field contains the name of the selected call destination. This may be the name of a person (e.g., John Smith), a department, or some other call destination. The first and second disambiguation fields 98, 100 may contain information that relates to the selected call destination (e.g., location or department) and may be used by disambiguation module 40 to disambiguate the hypothesis list.

The call routing systems and methods described herein are not limited to any particular hardware or software configuration, but rather they may be implemented in any computing or processing environment, including in digital electronic circuitry or in computer hardware, firmware, or software. In general, the call routing systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The call routing methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Referring back to FIG. 1, in the illustrated embodiment, call routing system 10 is implemented as a number of software modules operating on a server computer 102, which may communicate with a computer workstation 104 and access data contained in a data store 106 over a computer network 108 (e.g., a wide area network or a local area network). Data store 106 may contain the call destination directory 58, the heuristic profiles 77, and the subscriber database 55.

Figure 5:
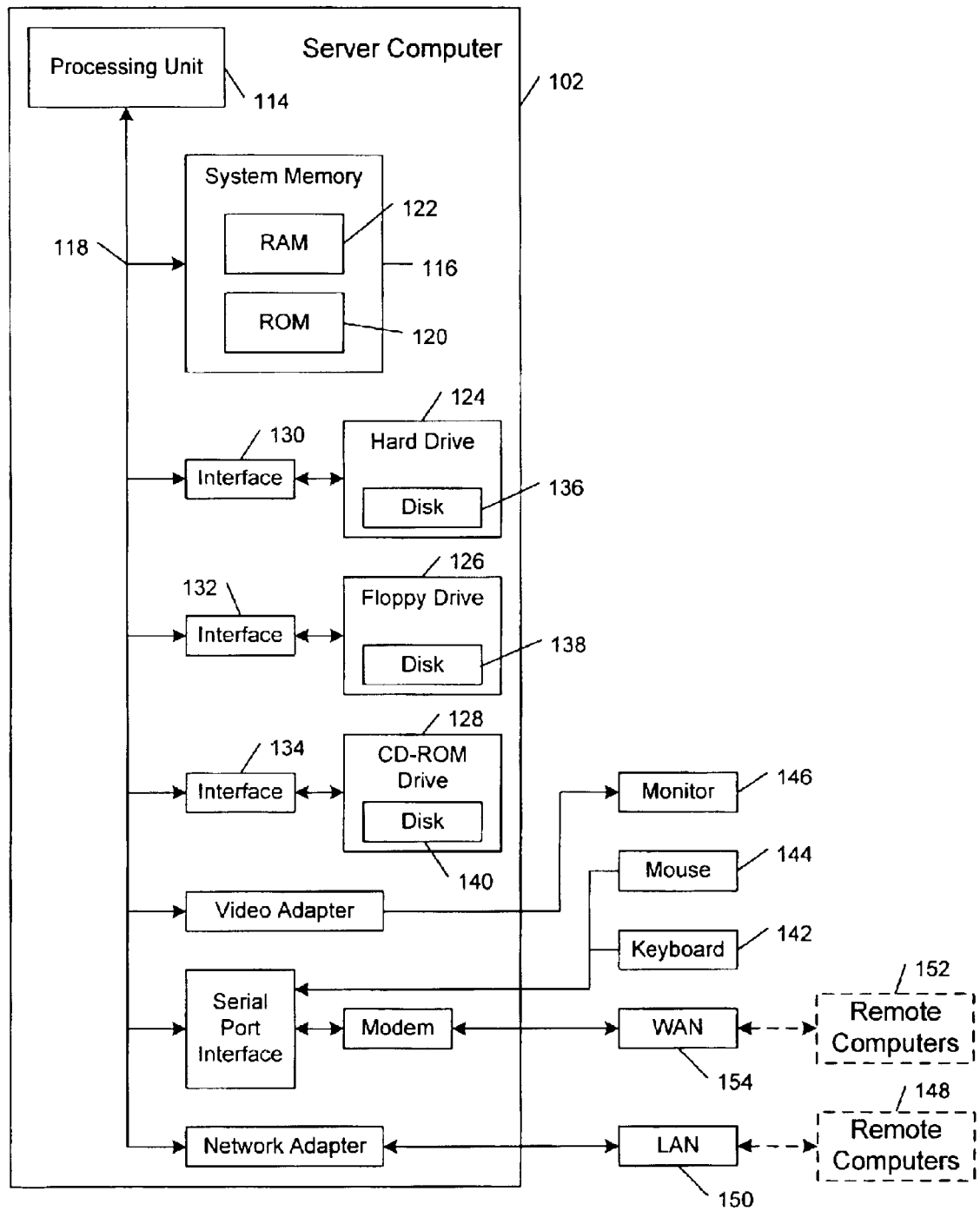
FIG. 5 is a block diagram of a server computer.

Referring to FIG. 5, in one exemplary embodiment, server computer 102 includes a processing unit 114, a system memory 116, and a system bus 118 that couples processing unit 114 to the various components of server computer 102. Processing unit 114 may include one or more processors, each of which may be in the form of any one of various commercially available processors. System memory 116 includes a read only memory (ROM) 120 that stores a basic input/output system (BIOS) containing start-up routines for server computer 102, and a random access memory (RAM) 122. System bus 118 may be a memory bus, a peripheral bus or a local bus, and may be compatible with any of a variety of bus protocols, including PCI, VESA, Microchannel, ISA, and EISA. Server computer 102 also includes a hard drive 124, a floppy drive 126, and CD ROM drive 128 that are connected to system bus 118 by respective interfaces 130, 132, 134. Hard drive 124, floppy drive 126, and CD ROM drive 128 contain respective computer-readable media disks 136, 138, 140 that provide non-volatile or persistent storage for data, data structures and computer-executable instructions. Other computer-readable storage devices (e.g., magnetic tape drives, flash memory devices, and digital video disks) also may be used with server computer 102. A user may interact (e.g., enter commands or data) with server computer 102 using a keyboard 142 and a mouse 144. Other input devices (e.g., a microphone, joystick, or touch pad) also may be provided. Information may be displayed to the user on a monitor 146. Server computer 102 also may include peripheral output devices, such as speakers and a printer. One or more remote computers 148 may be connected to server computer 102 over a local area network (LAN) 150, and one or more remote computers 152 may be connected to server computer 102 over a wide area network (WAN) 154 (e.g., the Internet).

Other embodiments are within the scope of the claims.

What is claimed is:

1. A call routing system, comprising:
   a search module operable to generate a hypothesis list of candidate call destinations based on one or more queries to a call destination directory in response to a call destination request received from a caller; and
   a disambiguation module operable to compare a hypothesis list generated in response to a call destination request by the caller and containing multiple candidate call destinations with a heuristic profile associated with the caller and containing one or more records of prior disambiguation selections made by the caller.

2. The system of claim 1, further comprising a caller interface for receiving call destination requests from the caller.

3. The system of claim 2, wherein the caller interface comprises an automatic speech recognition module.

4. The system of claim 2, wherein the caller interface comprises a caller identification module operable to identify the caller.

5. The system of claim 4, wherein the caller identification module is operable to identify the caller based at least in part on an identifier assigned to a communication channel being used by the caller.

6. The system of claim 4, wherein the caller identification module is operable to identify the caller based at least in part on information received from the caller.

7. The system of claim 1, wherein the disambiguation module is operable to store one or more disambiguation selections made by the caller in a heuristic profile associated with the caller.

8. The system of claim 7, wherein the caller's disambiguation selections are stored in the heuristic profile associated with the caller in the form of a data structure having an identification number field and a call destination name field.

9. The system of claim 7, wherein the caller's disambiguation selections are stored in the heuristic profile associated with the caller in first in, first out (FIFO) order.

10. The system of claim 1, wherein the disambiguation module is operable to select as a routing destination a call destination contained in both the hypothesis list and the heuristic profile associated with the caller.

11. The system of claim 10, wherein a routing destination is selected based on a first in, first out (FIFO) ordering of the heuristic profile associated with the caller.

12. The system of claim 10, wherein the disambiguation module is operable to generate one or more disambiguation questions for the caller in response to an indication received from the caller that the selected routing destination is incorrect.

13. The system of claim 1, wherein the disambiguation module is operable to compare a hypothesis list generated in response to a call destination request by the caller and containing multiple candidate call destinations with a generic heuristic profile when no heuristic profile is associated with the caller.

14. The system of claim 13, wherein the generic heuristic profile contains one or more sorted disambiguation selection records.

15. A call routing method, comprising:

generating a hypothesis list of candidate call destinations based on one or more queries to a call destination directory in response to a call destination request received from a caller; and comparing a hypothesis list generated in response to a call destination request by the caller and containing multiple candidate call destinations with a heuristic profile associated with the caller and containing one or more records of prior disambiguation selections made by the caller.

16. The method of claim 15, further comprising automatically recognizing voiced call destination requests received from the caller.

17. The method of claim 15, further comprising identifying the caller.

18. The method of claim 17, wherein the caller is identified based at least in part on an identifier assigned to a communication channel being used by the caller.

19. The method of claim 17, wherein the caller is identified based at least in part on information received from the caller.

20. The method of claim 15, further comprising storing one or more disambiguation selections made by the caller in a heuristic profile associated with the caller.

21. The method of claim 20, wherein the caller's disambiguation selections are stored in a heuristic profile associated with the caller in the form of a data structure having an identification number field and a call destination name field.

22. The method of claim 20, wherein the caller's disambiguation selections are stored in the heuristic profile associated with the caller in first in, first out (FIFO) order.

23. The method of claim 15, further comprising selecting as a routing destination a call destination contained in both the hypothesis list and the heuristic profile associated with the caller.

24. The method of claim 23, wherein a routing destination is selected based on a first in, first out (FIFO) ordering of the heuristic profile associated with the caller.

25. The method of claim 23, further comprising generating one or more disambiguation questions for the caller in response to an indication received from the caller that the selected routing destination is incorrect.

26. The method of claim 15, comparing a hypothesis list generated in response to a call destination request by the caller and containing multiple candidate call destinations with a generic heuristic profile when no heuristic profile is associated with the caller.

27. The method of claim 26, wherein the generic heuristic profile contains one or more sorted disambiguation selection records.

28. A computer program for call routing, the computer program residing on a computer-readable medium and comprising computer-readable instructions for causing a computer to:

generate a hypothesis list of candidate call destinations based on one or more queries to a call destination directory in response to a call destination request received from a caller; and compare a hypothesis list generated in response to a call destination request by the caller and containing multiple candidate call destinations with a heuristic profile associated with the caller and containing one or more records of prior disambiguation selections made by the caller.

* * * * *